(12) United States Patent
Ryba et al.

(10) Patent No.: US 8,302,643 B2
(45) Date of Patent: Nov. 6, 2012

(54) PNEUMATIC TIRE HAVING TREAD WITH ZONED CAP LAYER

(75) Inventors: Jennifer Lyn Ryba, Wadsworth, OH (US); Rachel Tamar Graves, Stow, OH (US); Matthew Jeremy List, Canton, OH (US); Nicholas John Hill, Waterford, MI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 117 days.

(21) Appl. No.: 12/845,081

(22) Filed: Jul. 28, 2010

(65) Prior Publication Data

US 2012/0024441 A1 Feb. 2, 2012

(51) Int. Cl.
*B60C 1/00* (2006.01)
*B60C 11/00* (2006.01)

(52) U.S. Cl. ................... 152/209.1; 152/209.5

(58) Field of Classification Search ........... 152/209.1, 152/209.5; 524/526
See application file for complete search history.

(56) References Cited

U.S. PATENT DOCUMENTS

| | | | | | |
|---|---|---|---|---|---|
| 5,409,988 | A | * | 4/1995 | Kikuchi | 524/526 |
| 5,811,499 | A | * | 9/1998 | Castner | 526/143 |
| 6,872,772 | B2 | * | 3/2005 | Steiner et al. | 524/526 |
| 6,998,448 | B2 | | 2/2006 | Zanzig et al. | 525/333.2 |
| 7,288,594 | B2 | | 10/2007 | Ozawa et al. | 525/105 |
| 7,342,070 | B2 | | 3/2008 | Tsukimawashi et al. | 525/105 |
| 7,367,369 | B2 | | 5/2008 | Sandstrom et al. | 152/209.1 |
| 7,405,256 | B2 | | 7/2008 | Hochi | 524/571 |
| 7,441,572 | B2 | * | 10/2008 | Weydert et al. | 152/209.1 |
| 7,511,108 | B2 | * | 3/2009 | Suzuki et al. | 526/340.4 |
| 7,559,348 | B2 | * | 7/2009 | Puhala et al. | 152/209.4 |
| 7,625,981 | B2 | | 12/2009 | Inagaki et al. | 525/192 |
| 7,714,055 | B2 | * | 5/2010 | Zanzig et al. | 524/445 |
| 7,956,146 | B2 | * | 6/2011 | Zhao et al. | 526/340.4 |
| 2003/0100660 | A1 | * | 5/2003 | Zanzig et al. | 524/492 |
| 2004/0054065 | A1 | * | 3/2004 | Zanzig et al. | 524/525 |
| 2004/0112490 | A1 | * | 6/2004 | Sandstrom | 152/152.1 |
| 2004/0118495 | A1 | * | 6/2004 | Sandstrom et al. | 152/209.5 |

(Continued)

FOREIGN PATENT DOCUMENTS

EP 1092565 A1 4/2001

(Continued)

OTHER PUBLICATIONS

European Search Report, dated Dec. 12, 2011.

*Primary Examiner* — Steven D Maki
*Assistant Examiner* — Robert Dye
(74) *Attorney, Agent, or Firm* — John D. DeLong

(57) ABSTRACT

A pneumatic tire having a rubber tread of a cap/base construction comprised of an outer rubber tread cap layer containing an outer running surface and an underlying rubber tread base layer, wherein said tread cap layer is comprised of a plurality of circumferential, longitudinal rubber tread cap zones of graduated physical properties, wherein said tread cap zones individually extend from said tread cap running surface radially inward to said tread base layer; wherein said tread cap zones are comprised of two primary tread cap zones and one central tread cap zone; wherein said central tread cap zone is positioned between said primary tread cap zones and spans at least 14 percent of the total running surface of the tread cap layer, wherein said primary tread cap zones are of substantially equal widths and collectively span at least 50 percent of the total running surface of the tread cap layer.

13 Claims, 1 Drawing Sheet

U.S. PATENT DOCUMENTS

| | | | |
|---|---|---|---|
| 2004/0249020 A1* | 12/2004 | Sandstrom et al. | 523/200 |
| 2004/0254301 A1* | 12/2004 | Tsukimawashi et al. | 525/271 |
| 2005/0065265 A1* | 3/2005 | Zanzig et al. | 524/445 |
| 2005/0167019 A1* | 8/2005 | Puhala et al. | 152/209.5 |
| 2006/0060285 A1* | 3/2006 | Weydert et al. | 152/905 |
| 2006/0063878 A1* | 3/2006 | Sandstrom et al. | 524/492 |
| 2007/0088132 A1 | 4/2007 | Taniguchi et al. | 525/342 |
| 2007/0185267 A1 | 8/2007 | Kobayashi et al. | 525/191 |
| 2007/0221303 A1* | 9/2007 | Sandstrom et al. | 152/209.5 |
| 2008/0287601 A1* | 11/2008 | Thiele et al. | 524/588 |
| 2009/0242091 A1* | 10/2009 | Puhala et al. | 152/209.5 |
| 2010/0186868 A1* | 7/2010 | Sandstrom et al. | 152/564 |
| 2010/0186869 A1 | 7/2010 | Sandstrom et al. | |
| 2010/0216939 A1* | 8/2010 | Zhao et al. | 524/573 |
| 2011/0124771 A1* | 5/2011 | Sandstrom et al. | 523/158 |

FOREIGN PATENT DOCUMENTS

| | | |
|---|---|---|
| EP | 1331107 A1 | 7/2003 |
| EP | 1612034 A1 | 1/2006 |
| EP | 1818188 A1 | 8/2007 |
| WO | 2007/047943 A2 | 4/2007 |

* cited by examiner

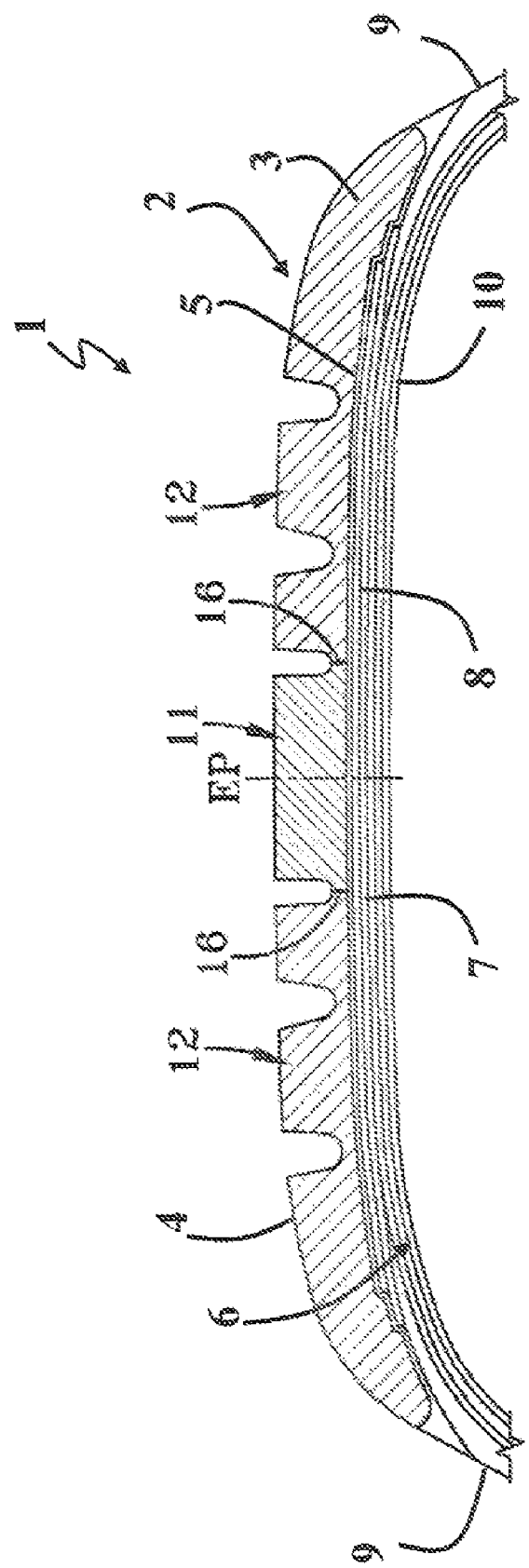

PNEUMATIC TIRE HAVING TREAD WITH ZONED CAP LAYER

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

SUMMARY OF THE INVENTION

The present invention is directed to a pneumatic tire having a rubber tread of a cap/base construction comprised of an outer rubber tread cap layer containing an outer running surface and an underlying rubber tread base layer, wherein said tread cap layer is comprised of a plurality of circumferential, longitudinal rubber tread cap zones of graduated physical properties, wherein said tread cap zones individually extend from said tread cap running surface radially inward to said tread base layer: wherein said tread cap zones are comprised of two primary tread cap zones and one central tread cap zone; wherein said central tread cap zone is positioned between said primary tread cap zones and spans at least 14 percent of the total running surface of the tread cap layer, wherein said primary tread cap zones are of substantially equal widths and collectively span at least 50 percent of the total running surface of the tread cap layer;

wherein the central tread cap zone comprises a vulcanizable rubber composition comprising, based on 100 parts by weight of elastomer (phr), (A1) from about 60 to about 90 phr of an emulsion or solution polymerized styrene-butadiene rubber with a styrene content of from about 20 to about 40 percent by weight, and a Tg of from about −55° C. to about −20° C.;

(A2) from about 40 to about 10 phr of a polybutadiene with a cis 1, 4 content of at least 90 percent, a number average molecular weight (Mn) of greater than 175,000 and a heterogeneity index (Mw/Mn) of less than 2.5;

(A3) from about 50 to about 150 phr of silica;

wherein the primary tread cap zones comprise a vulcanizable rubber composition comprising, based on 100 parts by weight of elastomer (phr), (B1) from about 60 to about 90 phr of a solution polymerized styrene-butadiene rubber functionalized with an alkoxysilane group and at least one functional group selected from the group consisting of primary amines and thiols;

(B2) from about 40 to about 10 phr of polybutadiene having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 and a heterogeneity index (Mw/Mn) in a range of from about 3/1 to about 5/1; and (B3) from about 50 to about 150 phr of silica.

BRIEF DESCRIPTION OF THE DRAWINGS

FIG.-1 shows a cross-sectional view of a tire tread according to one embodiment of the present invention.

DESCRIPTION OF THE INVENTION

There is disclosed a pneumatic tire having a rubber tread of a cap/base construction comprised of an outer rubber tread cap layer containing an outer running surface and an underlying rubber tread base layer, wherein said tread cap layer is comprised of a plurality of circumferential, longitudinal rubber tread cap zones of graduated physical properties, wherein said tread cap zones individually extend from said tread cap running surface radially inward to said tread base layer: wherein said tread cap zones are comprised of two primary tread cap zones and one central tread cap zone; wherein said central tread cap zone is positioned between said primary tread cap zones and spans at least 14 percent of the total running surface of the tread cap layer, wherein said primary tread cap zones are of substantially equal widths and collectively span at least 50 percent of the total running surface of the tread cap layer;

wherein the central tread cap zone comprises a vulcanizable rubber composition comprising, based on 100 parts by weight of elastomer (phr), (A1) from about 60 to about 90 phr of an emulsion or solution polymerized styrene-butadiene rubber with a styrene content of from about 20 to about 40 percent by weight, and a Tg of from about −55° C. to about −20° C.;

(A2) from about 40 to about 10 phr of a polybutadiene with a cis 1, 4 content of at least 90 percent, a number average molecular weight (Mn) of greater than 175,000 and a heterogeneity index (Mw/Mn) of less than 2.5;

(A3) from about 50 to about 150 phr of silica;

wherein the primary tread cap zones comprise a vulcanizable rubber composition comprising, based on 100 parts by weight of elastomer (phr), (B1) from about 60 to about 90 phr of a solution polymerized styrene-butadiene rubber functionalized with an alkoxysilane group and at least one functional group selected from the group consisting of primary amines and thiols;

(B2) from about 40 to about 10 phr of polybutadiene having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 and a heterogeneity index (Mw/Mn) in a range of from about 3/1 to about 5/1; and (B3) from about 50 to about 150 phr of silica.

FIG. 1 is provided as depicting a partial cross-sectional view of a tire having a tread of a cap/base construction where the outer tread cap layer is presented with two primary tread cap zones together with one central tread cap zone.

FIG. 1 represents a partial cross-section of a tire (1) having a tread (2) comprised of an outer tread cap layer (3) having a running surface (4) intended to be ground-contacting and underlying tread base layer (5) as a transition zone between said tread cap layer (3) and tire carcass (6) which may include a rubber encapsulated belt layer (7); two spaced apart relatively inextensible beads (not shown) to accommodate mounting the tire on a rigid rim (not shown), carcass plies as rubber encapsulated fabric reinforced plies (8) extending between said beads through a crown region of the tire (1), a pair of partially shown sidewalls (9) individually extending between said beads and outer, peripheral edges of said tread (2) and a rubber innerliner layer (10).

The tread cap layer (3) is comprised of three circumferential longitudinal zones of rubber compositions. The tread cap zones extend from the outer running surface (4) of the tread cap layer (3) radially inward to the underlying rubber tread base layer (5) which does not contain the zones of the tread cap zones.

The zones of said tread cap layer (3) are comprised of a central zone (11) centered over the centerline, or equatorial plane (EP), of the tire and positioned between two individual primary tread cap zones (12).

In one embodiment, the central tread cap zone (11) spans about 14 to about 50 percent of the area of the total running surface (4) of the tire tread cap layer (3), which includes the spaces (14) across the openings of any included grooves, including the circumferential grooves (15). In one embodiment, the primary tread cap zones (12) are each individually of substantially the same width and collectively span about 25 to about 43 percent of the area of the said total running surface (4) of the tire tread cap layer (3).

Divisional junctions (16) are provided between the central tread cap zone (11) and the primary tread cap zones (12) which are located within the circumferential grooves (15).

The rubber composition of the primary tread cap zones includes a styrene-butadiene rubber functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group may be at least one of methoxysilyl group and ethoxysilyl group.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of (styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

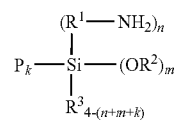

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

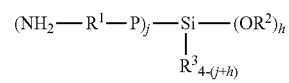

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl)aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III

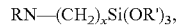

wherein R in combination with the nitrogen (N) atom is a protected amine group which upon appropriate post-treatment yields a primary amine, R represents a group having 1 to 18 carbon atoms selected from an alkyl, a cycloalkyl, an allyl, or an aryl; and X is an integer from 1 to 20. In one embodiment, at least one R group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

In one embodiment, the rubber composition includes from about 60 to about 90 phr of styrene-butadiene rubber functionalized with an alkoxysilane group and a primary amine group or thiol group.

Suitable styrene-butadiene rubbers functionalized with an alkoxysilane group and a primary amine group are available commercially, such as HPR 355 from Japan Synthetic Rubber (JSR).

In one embodiment, the solution polymerized styrene-butadiene rubber is as disclosed in WO2007/047943 and is functionalized with an alkoxysilane group and a thiol, and comprises the reaction product of a living anionic polymer and a silane-sulfide modifier represented by the formula VII

wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl. In one embodiment, $R^5$ is a $(C_1-C_{16})$ alkyl. In one embodiment, each $R^4$ group is the same or different, and each is independently a $C_1-C_5$ alkyl, and $R^5$ is $C_1-C_5$ alkyl.

Suitable styrene-butadiene rubbers functionalized with an alkoxysilane group and a thiol group are available commercially, such as a developmental functionalized SBR from Dow Olefinverbund GmbH which is of the type of silane/thiol functionalized SBR described in WO2007/047943.

Another component of the rubber composition is a specialized cis 1,4-polybutadiene elastomer having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 (relatively low Mn for a cis 1,4-polybutadiene elastomer) and a heterogeneity index (Mw/Mn) in a range of from about 3/1 to about 5/1 (a relatively high heterogeneity index range illustrating a significant disparity between its weight average and number average molecular weights).

The specialized cis 1,4-polybutadiene elastomer may be prepared, for example, by organic solvent solution polymerization of 1,3-butadiene monomer in the presence of a catalyst comprised of an organonickel or organocobalt compound, an organoaluminum compound, a fluorine-containing compound, and a para styrenated diphenylamine which is exemplified in U.S. Pat. No. 5,451,646. Such catalyst components may be comprised of nickel octoate, triisobutylaluminum, hydrogen fluoride and para styrenated diphenylamine. It is considered herein that such specialized cis 1,4-polybutadiene may be suitably prepared by such polymerization without undue experimentation.

The relatively broad heterogeneity index (Mw/Mn ratio range of 3/1 to 5/1) of the specialized cis 1,4-polybutadiene elastomer is considered herein to be significant to promote improved processing of the unvulcanized rubber composition of which a major, rather than a minor, fraction of its rubber component is the specialized cis 1,4-polybutadiene rubber, in a sense of promoting a relatively smooth surfaced extrudate, as compared to similar and more typical cis 1,4-polybutadiene elastomers rubber having the aforesaid significantly higher molecular weight and significantly lower heterogeneity index in a range of from about 1.5/1 to about 2.5/1. The specialized cis 1,4-polybutadiene elastomer is also considered herein to be unique in that it is configured with a level, or degree, of branching.

In one embodiment, the rubber composition includes from about 40 to about 10 phr of the specialized polybutadiene rubber. Suitable specialized polybutadiene rubber is available commercially, such as Budene® 4001 from Goodyear and the like.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The rubber composition of the central tread cap zone includes from about 60 to about 90 phr of an emulsion or solution polymerized styrene-butadiene rubber with a styrene content of from about 20 to about 40 percent by weight, and a Tg of from about −55° C. to about −20° C.; and from about 40 to about 10 phr of a polybutadiene with a cis 1, 4 content of at least 90 percent, a number average molecular weight (Mn) of greater than 175,000 and a heterogeneity index (Mw/Mn) of less than 2.5.

The vulcanizable rubber compositions may include from about 50 to about 150 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber compositions may include from about 5 to about 50 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

The vulcanizable rubber compositions may include both silica and carbon black in a combined concentration of from about 20 to about 100 phr, in any weight ratio of silica to carbon black. In one embodiment, the vulcanizable rubber composition includes both silica and carbon black in approximately the same weight amounts, i.e., a weight ratio of about 1.

Other fillers may be used in the rubber compositions including, but not limited to, particulate fillers including ultra high molecular weight polyethylene (UHMWPE), particulate polymer gels such as those disclosed in U.S. Pat. No. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber compositions for use in the tire component to additionally contain a conventional sulfur containing organosilicon compound. Examples of suitable sulfur containing organosilicon compounds are of the formula:

Z-Alk-S$_n$-Alk-Z    VIII in which Z is selected from the group consisting of

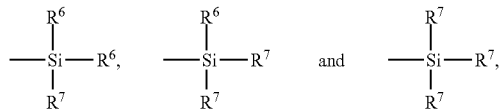

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilyipropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilyipropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl)tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula VIII, preferably Z is

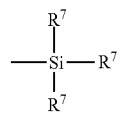

where R$^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S[3-(triethoxysilyl)propyl]thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber compositions would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, paraffinic, and low PCA (polycyclic aromatic) oils such as MES, TDAE, heavy naphthenic, and SRAE processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber compositions can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature (s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber compositions are incorporated into the tread cap of the tire.

The pneumatic tire of the present invention may be a race tire, passenger tire, aircraft tire, agricultural, earthmover, off-the-road; truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example I

In this example, the effect of combining a styrene-butadiene rubber functionalized with alkoxysilane and thiol groups with a specialized polybutadiene is illustrated.

The elastomers were compounded in a three-step mix procedure with standard amounts of conventional curatives and processing aids as indicated in Table 1, and cured with a standard cure cycle. Cured samples were evaluated for various physical properties following standard tests protocols as indicated in Table 2.

TABLE 1

| | Sample No. | |
|---|---|---|
| | 1 | 2 |
| First Non Productive Step | | |
| SBR[1] | 0 | 74 |
| SBR-functionalized[2] | 67 | 0 |
| Polybutadiene[3] | 0 | 26 |
| Polybutadiene-specialized[4] | 33 | 0 |
| Silica | 0 | 53 |
| CT Silica[4,1] | 50 | 0 |
| Process Oil | 18 | 31 |
| Tall oil fatty acid | 3.0 | 3 |
| Zinc Oxide | 1.75 | 0 |
| Silane Disulfide[5] | 0.98 | 4.25 |
| Carbon Black | 0 | 0 |
| Waxes | 0 | 0 |
| Second Non Productive Step | | |
| Carbon Black | 10 | 10 |
| Waxes[6] | 1.5 | 1.5 |
| Antidegradant[7] | 2 | 2 |
| Process Oil | 9 | 0 |
| Silica | 0 | 25 |

TABLE 1-continued

|   | Sample No. | |
|---|---|---|
|   | 1 | 2 |
| CT Silica[4.1] | 26 | 0 |
| Silane Disulfide[5] | 0 | 2.24 |
| Resin | 3.5 | 3 |
| Productive Step | | |
| Antidegradant[7] | 0.75 | 0.75 |
| Sulfur | 1.2 | 1.9 |
| Accelerators[8] | 3.0 | 3.8 |

[1]Solution polymerized styrene-butadiene rubber, 25% styrene, 60% vinyl, 40 Mooney and Tg = −26° C.
[2]Solution polymerized styrene-butadiene rubber as SE-SLR 4602 from Dow Olefinverbund GmbH which is of the type of silane/thiol functionalized SBR described in WO2007/047943.
[3]Cis 1,4-polybutadiene rubber obtained as Budene® 1207 from The Goodyear Tire & Rubber Company having a cis 1,4-content of at least 96 percent and a Tg of about −100° C.
[4]Cis 1,4-polybutadiene elastomer as Budene® 4001 from The Goodyear Tire & Rubber Company having a Tg of about −104° C., Mooney (ML1 + 4) viscosity of about 45, an Mn of about 127,000, an Mw of about 445,000, a broad heterogeneity index (HI) of about 3.5 and a cis 1,4-isomeric content of about 98 percent obtained by organic solvent polymerization of 1,3-butadiene monomer as described in U.S. Pat. No. 5,451,646.
[4.1]Silica pretreated with bis(triethoxysilylpropyl) disulfide
[5]bis(triethoxysilylpropyl) disulfide
[6]paraffinic and microcrystalline types
[7]p-phenylenediamine and quinoline type
[8]sulfenamide and guanidine type

TABLE 2

|   | Sample | |
|---|---|---|
|   | 1 | 2 |
| SBR | 0 | 74 |
| SBR-functionalized | 70 | 0 |
| Polybutadiene | 0 | 26 |
| Polybutadiene-specialized | 30 | 0 |
| RPA[1] 0.83 Hz, 100° C., 15% strain | | |
| RPA G', uncured, kPa | 217 | 204 |
| RPA[1] 11 Hz, 100° C., 10% strain | | |
| RPA, cured tan delta | 0.152 | 0.167 |
| Rebound 0° C. | 22 | 18.3 |
| Rebound 100° C. | 63 | 59 |
| Modulus[2] @ 300%, MPa | 10.6 | 10.7 |
| Tear Strength, N | 58.8 | 80 |

[1]Data according to Rubber Process Analyzer as RPA 2000 .TM. instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.
[2]Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.

Example II

In this example, three test tires (P215/55R17) were prepared and tested for rolling resistance and traction. Each of the three tires were identical except for the tread compounds. Sample tire A had a tread compound corresponding to sample 2 of Example 1 across the entire tread width. Sample tire B had a tread compound corresponding to sample 1 of Example 1 across the entire tread width. Sample tire C had tread compound of sample 2 in a center tread zone corresponding to about 30 percent of the tread width, and tread compound of sample 1 in two primary tread zones each corresponding to about 35 percent of the tread width and disposed laterally on either side of the central tread zone, following the drawing.

The rolling resistance testing protocol was based on SAE J2452, "Stepwise Coastdown Methodology for Measuring Tire Rolling Resistance."

The traction testing protocol was based on ASTM F408, "Standard Test Method for Tires for Wet Traction in Straight-Ahead Braking, Using a Towed Trailer." The standard test conditions measure the peak and slide resistance at two speeds; 32.2 and 96.6 km/hr (20 and 60 mph). For this testing another speed of 64.4 km/hr (40 mph) for dry traction was added.

Rolling resistance and traction test results are given in Table 3.

TABLE 3

|   | Tire No. | | |
|---|---|---|---|
|   | A | B | C |
| Tread Type | Sample 2 | Sample 1 | Sample 1/Sample 2/Sample 1 |
| Rolling Resistance (SAE J2452) | | | |
| 1.7M RR (N) | 21.7 | 20.6 | 19.88 |
| RRC[1] | 0.0049 | 0.0046 | 0.0045 |
| Traction (ASTM F408-86) Peak/Slide[2] | | | |
| 32 km/hr wet | 121/107 | 126/111 | 129/112 |
| 97 km/hr wet | 114/96 | 109/91 | 105/96 |
| 64 km/hr dry | 116/107 | 118/114 | 116/109 |

[1]RRC = rolling resistance coefficient according to SAE J2452
[2]Peak = peak observed coefficient of friction; slide = sliding coefficient of friction, both referenced to an ASTM control tire having peak and slide values = 100.

As seen in Table 3, lower rolling resistance was seen for test tire C with the multiple tread compounds, as compared with control tires A and B. The dry traction results for tire C were maintained at levels comparable to controls A and B.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a rubber tread of a cap/base construction comprised of an outer rubber tread cap layer containing an outer running surface and an underlying rubber tread base layer, wherein said tread cap layer is comprised of a plurality of circumferential, longitudinal rubber tread cap zones of graduated physical properties, wherein said tread cap zones individually extend from said tread cap running surface radially inward to said tread base layer: wherein said tread cap zones are comprised of two primary tread cap zones and one central tread cap zone; wherein said central tread cap zone is positioned between said primary tread cap zones and spans at least 14 percent of the total running surface of the tread cap layer, wherein said primary tread cap zones are of substantially equal widths and collectively span at least 50 percent of the total running surface of the tread cap layer;
   wherein the central tread cap zone comprises a vulcanizable rubber composition comprising, based on 100 parts by weight of elastomer (phr),
   (A1) from about 60 to about 90 phr of an emulsion or solution polymerized styrene-butadiene rubber with a styrene content of from about 20 to about 40 percent by weight, and a Tg of from about −55° C. to about −20° C.;
   (A2) from about 40 to about 10 phr of a polybutadiene with a cis 1, 4 content of at least 90 percent, a number average molecular weight (Mn) of greater than 175,000 and a heterogeneity index (Mw/Mn) of less than 2.5;
   (A3) from about 50 to about 150 phr of silica;
   wherein the primary tread cap zones comprise a vulcanizable rubber composition comprising, based on 100 parts by weight of elastomer (phr), (B1) from about 60 to about 90 phr of a solution polymerized styrene-butadiene rubber functionalized with an alkoxysilane group and at least one functional group selected from the group consisting of primary amines and thiols;

(B2) from about 40 to about 10 phr of polybutadiene having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 and a heterogeneity index (Mw/Mn) in a range of from about 3/1 to about 5/1; and (B3) from about 50 to about 150 phr of silica.

2. The pneumatic tire of claim 1, wherein the solution polymerized styrene-butadiene rubber functionalized with an alkoxysilane group and a primary amine group, and is represented by the formula (1) or (2)

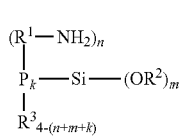
(1)

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

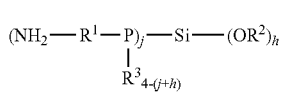
(2)

wherein P, $R^1$, $R^2$ and $R^3$ have the same definitions as give for the above-mentioned formula (1), j is an integer of 1 to 3, and h is an integer of 1 to 3, with the provision that j+h is an integer of 2 to 4.

3. The pneumatic tire of claim 1, wherein the solution polymerized styrene-butadiene rubber of the primary tread cap zones is functionalized with an alkoxysilane group and a primary amine group comprises the reaction product of a living polymer chain and a terminating agent of the formula

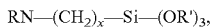
I wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20.

4. The pneumatic tire of claim 3, wherein the terminating agent is selected from the group consisting of N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis (trimethylsilyl)aminopropyltriethoxysilane, N,N-bis (trimethylsilyl)aminopropylmethyldiethoxysilane, N,N-bis (trimethylsilyl)aminoethyltrimethoxysilane, N,N-bis (trimethylsilyl)-aminoethyltriethoxysilne, N,N-bis (trimethylsilyl)aminoethylmethyldimethoxysilane, and N,N-bis(trimethylsilyl)aminoethylmethyldiethoxysilane.

5. The pneumatic tire of claim 1 wherein the solution polymerized styrene-butadiene rubber of the primary tread cap zones is functionalized with an alkoxysilane group and a thiol, and comprises the reaction product of a living anionic polymer and a silane-sulfide modifier represented by the formula

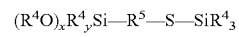

wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl.

6. The pneumatic tire of claim 5 wherein $R^5$ is a $(C_1-C_{16})$ alkyl.

7. The pneumatic tire of claim 5 wherein each $R^4$ group is the same or different, and each is independently a $C_1-C_5$ alkyl, and $R^5$ is $C_1-C_5$ alkyl.

8. The pneumatic tire of claim 1, wherein said vulcanizable rubber compositions each comprise about 50 to about 100 phr of silica.

9. The pneumatic tire of claim 1, wherein the central tread cap zone spans about 14 to about 50 percent of the area of the total running surface of the tire tread cap layer.

10. The pneumatic tire of claim 1, wherein the primary tread cap zones are each individually of substantially the same width and collectively span about 25 to about 43 percent of the area of the said total running surface of the tire tread cap layer.

11. The pneumatic tire of claim 1, wherein said vulcanizable rubber compositions further comprises from about 5 to about 50 phr of carbon black.

12. The pneumatic tire of claim 1, wherein said vulcanizable rubber compositions comprise silica and carbon black in a combined concentration of from about 20 to about 100 phr.

13. The pneumatic tire of claim 1, wherein said vulcanizable rubber compositions comprise silica and carbon black in a combined concentration of from about 20 to about 100 phr and a weight ratio of about 1.

* * * * *